(12) United States Patent
Alexeev et al.

(10) Patent No.: US 9,898,350 B2
(45) Date of Patent: Feb. 20, 2018

(54) TECHNIQUES FOR SYNCHRONIZING OPERATIONS PERFORMED ON OBJECTS

(71) Applicant: EMC Corporation, Hopkinton, MA (US)

(72) Inventors: Sergey Alexandrovich Alexeev, St. Petersburg (RU); Alexey Vladimirovich Shusharin, St. Petersburg (RU); Ilya Konstantinovich Morev, St. Petersburg (RU); Sergey Alexandrovich Zaporozhtsev, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 14/903,136

(22) PCT Filed: Mar. 20, 2015

(86) PCT No.: PCT/RU2015/000162
§ 371 (c)(1),
(2) Date: Jan. 6, 2016

(87) PCT Pub. No.: WO2016/153376
PCT Pub. Date: Sep. 29, 2016

(65) Prior Publication Data
US 2017/0109215 A1    Apr. 20, 2017

(51) Int. Cl.
*G06F 9/46* (2006.01)
*G06F 9/52* (2006.01)
(Continued)

(52) U.S. Cl.
CPC .............. *G06F 9/52* (2013.01); *G06F 9/5055* (2013.01); *G06F 17/30362* (2013.01)

(58) Field of Classification Search
None
See application file for complete search history.

(56) References Cited

U.S. PATENT DOCUMENTS 7,065,763 B1    6/2006  Martin et al.
2003/0126187 A1*  7/2003  Won .................... G06F 9/52
                                                   718/107
(Continued)

FOREIGN PATENT DOCUMENTS

GB    2466976 A    7/2010

OTHER PUBLICATIONS

VNXe3200 Product Release, Apr. 30, 2014, http://www.emc.com/about/news/press/2014/20140430.htm.
(Continued)

*Primary Examiner* — Wissam Rashid
(74) *Attorney, Agent, or Firm* — Muirhead and Saturnelli, LLC

(57) ABSTRACT

Described are techniques for synchronizing operations performed on objects. Locking tables may be received where each of the locking tables corresponds to different object class. First processing may be performed by a first thread to acquire a set of one or more locks. Each lock in the set may be a lock for one of the objects. The first processing may include traversing the locking tables in accordance with a predefined ordering and acquiring the set of one or more locks, wherein, for each lock in the set, a first entry is updated in a first of the locking tables to indicate that the first thread has acquired the lock on one of the objects included in an associated object class corresponding to the first locking table.

17 Claims, 10 Drawing Sheets

(51) Int. Cl.
*G06F 17/30* (2006.01)
*G06F 9/50* (2006.01)

(56) References Cited

U.S. PATENT DOCUMENTS

2008/0059470 A1* 3/2008 Shavit ............... G06F 17/30362
2011/0161540 A1* 6/2011 Chang .................... G06F 9/526
                                                         710/200

OTHER PUBLICATIONS

International Search Report and Written Opinion dated Nov. 27, 2015.

* cited by examiner

FIG. 6

| Read 312a | Write 312b |
|---|---|
| Blocking 316a | Blocking 316b |
| Blocking 316c | Blocking 316d |

Read 314a | Write 314b

400

TECHNIQUES FOR SYNCHRONIZING OPERATIONS PERFORMED ON OBJECTS

BACKGROUND

Technical Field

This application generally relates to synchronizing access to shared resources.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of synchronizing operations performed on objects comprising: receiving a plurality of locking tables, each of said plurality of locking tables corresponding to a different one of a plurality of object classes; and performing first processing by a first thread to acquire a set of one or more locks, each lock in said set being a lock for one of the objects, the first processing including: traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table. Each of the plurality of locking tables may be associated with a different one of a plurality of locking events which fires when said each locking table is modified. The first processing may include acquiring a locking guard by said first thread; responsive to the first thread acquiring the locking guard, determining whether one or more objects in a first of the plurality of object classes associated with a particular one of the plurality of locking tables are currently in unblocked states whereby the first thread is able to acquire one or more locks on said one or more objects of the first object class; if it is determined that the first thread is not able to acquire the one or more locks on the one or more objects of the first object class, performing second processing comprising: releasing the locking guard by the first thread; and waiting on a first of the locking events associated with the particular one of the plurality of locking tables. The method may include modifying the particular one of the plurality of locking tables; responsive to said modifying, firing said first locking event of the particular one of the plurality of locking tables; and responsive to said firing, resuming execution of said first thread and performing second processing including: acquiring the locking guard by the first thread; determining whether the one or more objects in the first object class associated with the particular one of the plurality of locking tables are currently in unblocked states whereby the first thread is able to acquire the one or more locks on said one or more objects of the first object class; and if it is determined that the one or more objects in the first object class associated with the particular one of the plurality of locking tables are currently in unblocked states, acquiring, by said first thread, the one or more locks on the one or more objects of the first object class. For each of the one or more objects of the first object class for which the first thread acquired a lock, processing may include updating a corresponding entry in the particular one of the plurality of locking tables to indicate the first thread has acquired a lock on said each object. The method may include performing third processing, if it is determined that the first thread is able to acquire the one or more locks on the one or more objects of the first object class, where the third processing includes updating the particular one of the plurality of locking tables to indicate that the first thread has acquired the one or more locks on the one or more objects of the first object class; and releasing the locking guard by the first thread. Each of the objects may represent an entity in a data storage system and wherein the entity may be any of a physical or logical entity in the data storage system and includes any of a storage processor, a physical storage device, a logical device, a storage pool, a RAID group, and a storage group. Each of the plurality of locking tables may correspond to a different classification of physical or logical entities in the data storage system. The objects may be data storage management objects reflecting internal states of data storage system entities represented by the objects, and wherein the objects may be used to control synchronization of operations performed on the data storage system entities. Each of the objects that is included one of the object classes and is currently locked by a thread may have an entry in one of the plurality of locking tables for said one object class. At any point in time, if there is no entry in said one locking table for said each object, then said each object may not be currently locked by any thread. The first entry in the first locking table may include state information indicating that the first thread holds said each lock on said one object. Each lock may be any of a read lock and a write lock. Each lock may be a read lock and indicates that shared read access to said one object is allowed by multiple threads whereby a subsequent attempt to concurrently acquire another read lock for said one object is allowed and a subsequent attempt to concurrently acquire a write lock for said one object is blocked. Each lock may be a write lock and indicates that the first thread has exclusive access to said one object whereby a subsequent attempt to concurrently acquire any of a write lock and a read lock for said one object is blocked. Each lock may be an exclusive lock and a shared lock, wherein if said each lock is an exclusive lock then a subsequent attempt to concurrently acquire any lock for said one object is blocked. The first thread may be one of a plurality of threads and each of said plurality of threads may acquire one or more locks for one or more objects needed by said each thread, and may perform processing including traversing said plurality of locking tables in accordance with the predefined ordering and acquiring the one or more locks for one or more objects needed by said each thread. The locking guard may be any of: a single locking guard associated with said plurality of locking tables that provides exclusive access to said plurality of locking tables to any thread holding the locking guard, and a first of a plurality of locking guards associated with the plurality of locking tables where the locking guard provides exclusive access to the particular one of the plurality of locking tables to any thread holding the locking guard.

In accordance with another aspect of the invention is a computer readable medium comprising code stored thereon that, when executed, performs a method of synchronizing operations performed on objects comprising: receiving a plurality of locking tables, each of said plurality of locking tables corresponding to a different one of a plurality of object classes; and performing first processing by a first thread to acquire a set of one or more locks, each lock in said set being a lock for one of the objects, said first processing including: traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table.

In accordance with another aspect of the invention is a system comprising: a processor; and a memory comprising code that, when executed by the processor, performs method of synchronizing operations performed on objects comprising: receiving a plurality of locking tables, each of said plurality of locking tables corresponding to a different one of a plurality of object classes; and performing first processing by a first thread to acquire a set of one or more locks, each lock in said set being a lock for one of the objects, said first processing including: traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5 and 6 are examples illustrating blocking and non-blocking states for different lock types in an embodiment in accordance with techniques herein.

DETAILED DESCRIPTION OF
EMBODIMENT(S)

Figure 1:
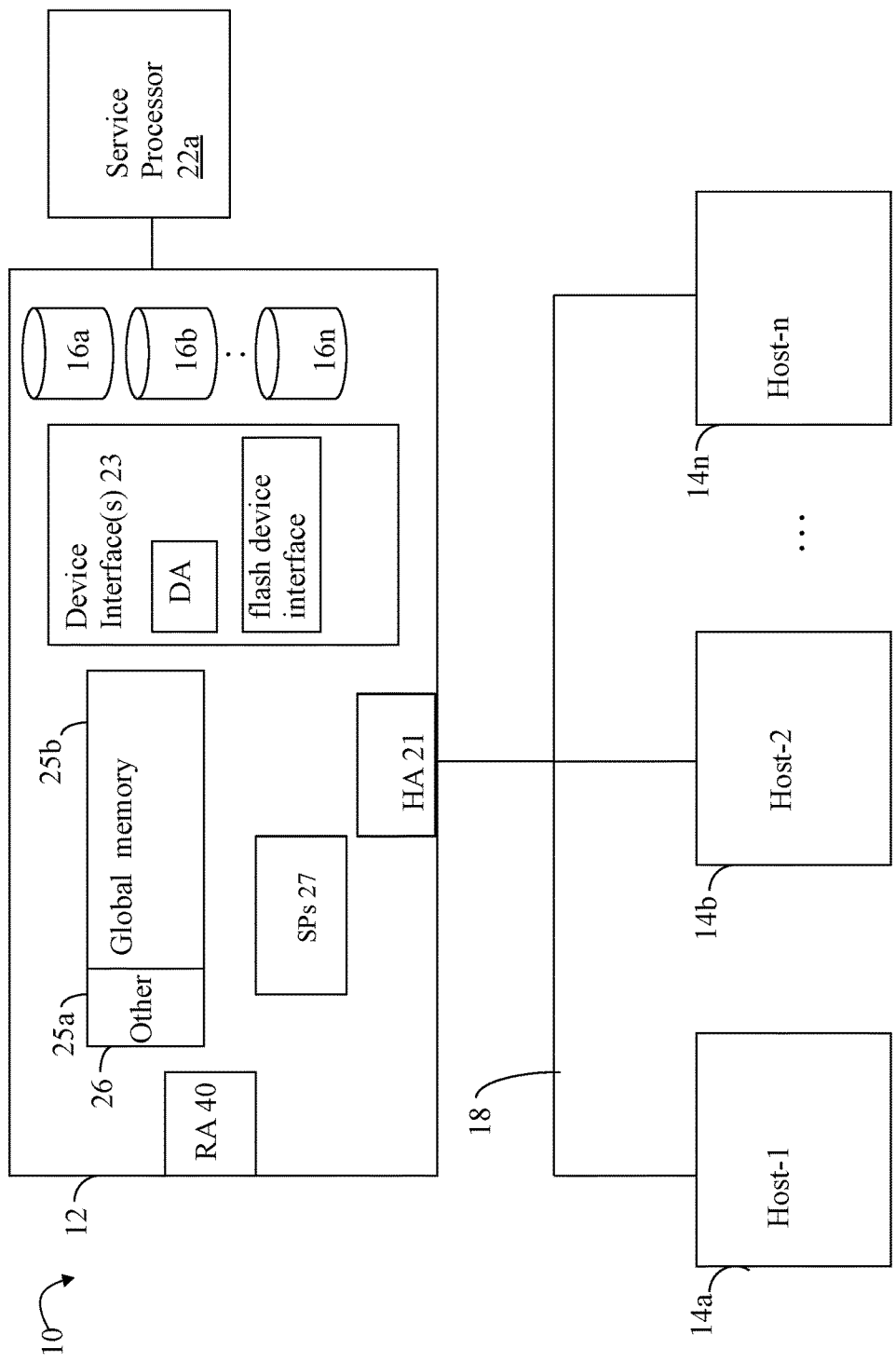
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

Figure 2:
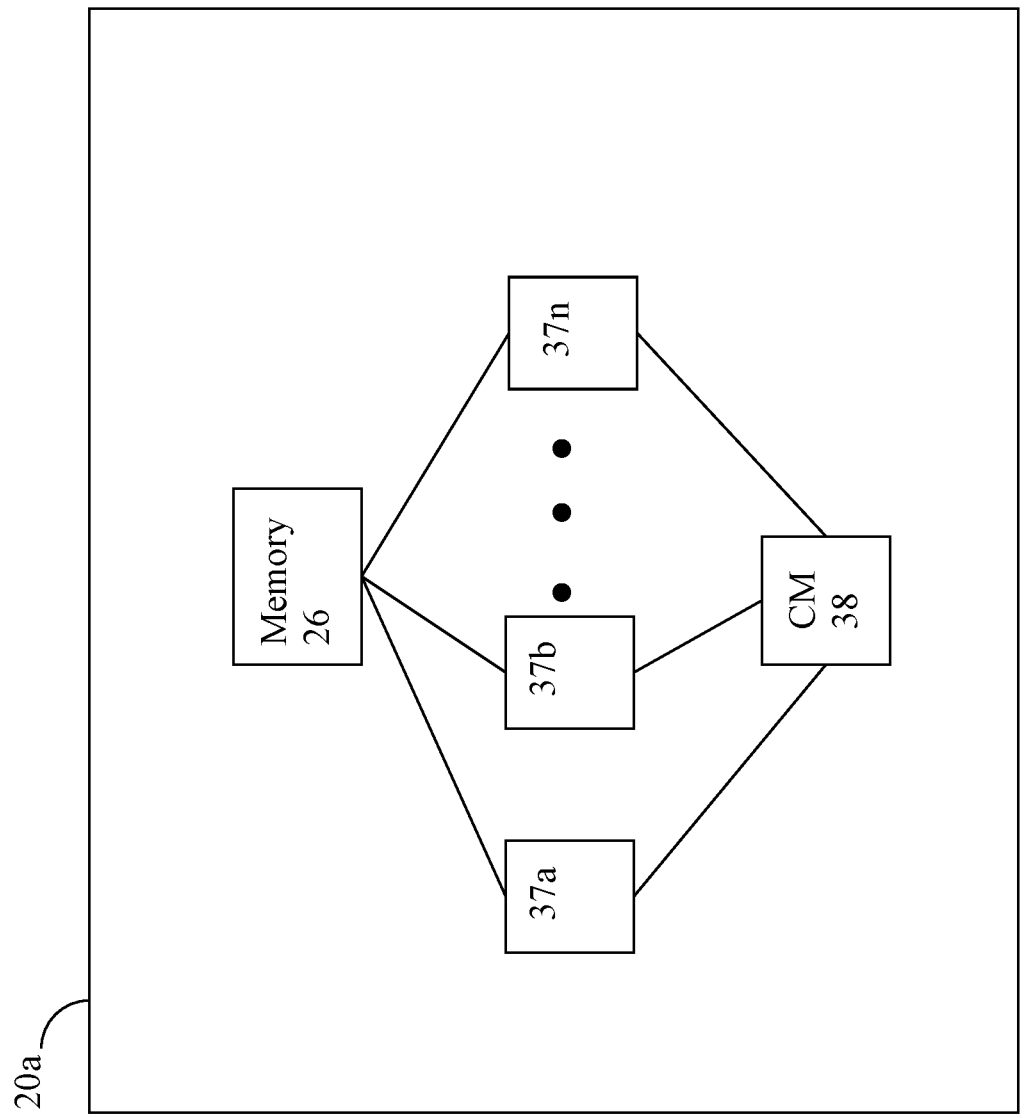
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe ® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. In the foregoing data storage array, the data storage devices 16a-16n may include a combination of disk devices and flash devices in which the flash devices may appear as standard Fibre Channel (FC) drives to the various software tools used in connection with the data storage array.

Described in following paragraphs are techniques that may be used in connection with synchronizing access to shared resources, such as may be shared between two or more threads or other entities of executing code. Embodiments in following paragraphs are described with reference to a data storage system. However, such techniques may be more generally applied for use in any suitable system with any shared resource.

In data storage systems, management and orchestration software may represent physical and logical storage system entities as management objects. Such physical and logical entities may include, for example, storage processors, physical storage devices, storage pools, RAID groups, logical devices such as LUNs, and storage groups (e.g., a storage group may be a logical defined grouping of one or more logical devices). In one embodiment in accordance with techniques herein, the management objects may reflect internal state information of the represented entities and the objects may be used to control and synchronize operations performed on the represented entities.

One aspect of control provided using the management object representing an entity is synchronization of management operations performed on the represented entity. Such management operations may be performed, for example, by a storage administrator or internal data storage system component. One of the important aspects of operations control is synchronization of the changes applied to different storage system entities by concurrently running operations to guarantee consistency of the storage system's internal state and provide consistent user experience.

For example, an object may represent a LUN. An operation may be to provision storage for the LUN. During provisioning of physical storage for the LUN, the object representing the LUN may reflect the state, provisioning, of the LUN. The object may be used to synchronize and control operations performed on the LUN. For example, during provisioning, the object may have an associate state of locked blocking any other access or operation from being performed on the LUN. Thus, the object may have a locked state during provisioning which provides exclusive access of the LUN and its associated object to the provisioning operation process or thread(s).

The level of granularity or association of management object and synchronization object may vary. As a first case, there may be a synchronization object per management object. As a second case, there may be a synchronization object per group of management objects, such as per management object class). As a third case, there may be a synchronization object per operation type or class of operation types.

Described in following paragraphs are techniques that provide for the management objects synchronization while also keeping intuitiveness of the standard locking interfaces. Such techniques may be characterized as a variation of the first case noted above and may be referred to herein as instance level locking which has the advantage of locking on the individual management object level with limited use of existing synchronization primitives of the operating system.

In one embodiment in accordance with techniques herein, the system locking state may be represented by a set of locking tables.

Figure 3:
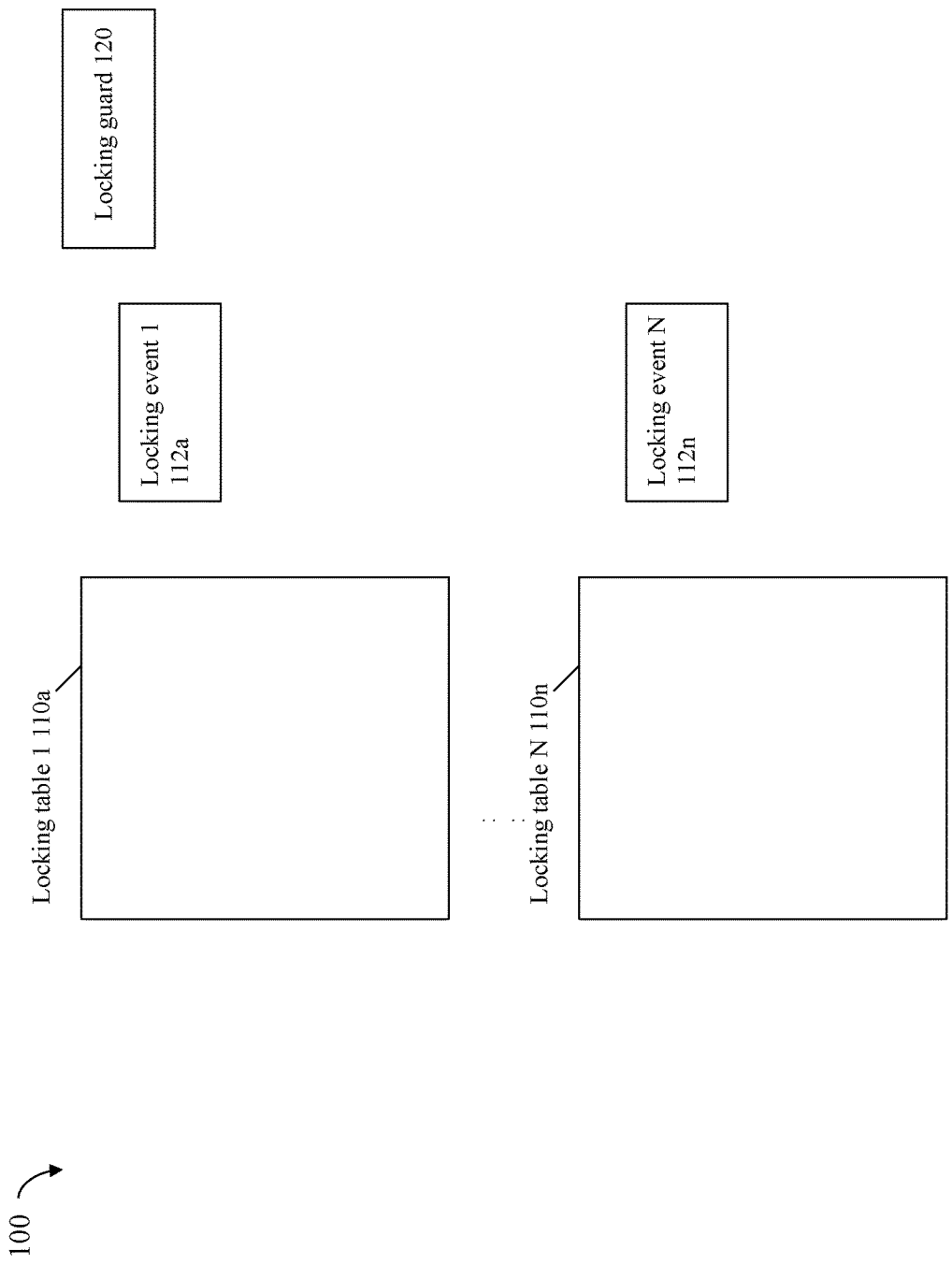
FIGS. 3 and 6A are examples illustrating locking tables, associated locking events, and a locking guard that may be used in embodiments in accordance with techniques herein.

Referring to FIG. 3, shown is an example of locking tables that may be used in an embodiment in accordance with techniques herein. In the example 100, shown are N locking tables 110a-110n. There may be a locking table instance per management object class. For example, a management object class may refer to a classification or category of management objects such as LUNs, physical storage devices, file systems, storage groups, storage processors, and the like. With reference to FIG. 3, locking table 1 110a may represent the LUN management object class and locking table N 110n may represent the file system management object class.

Figure 4:
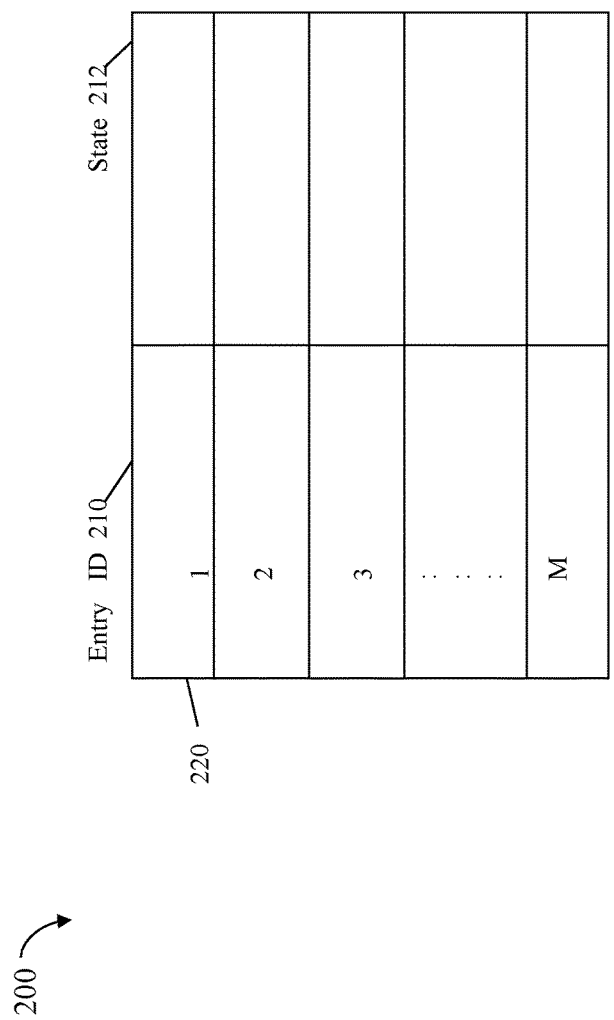
FIG. 4 is an example illustrating information that may be stored in each locking table in an embodiment in accordance with techniques herein.

Each locking table for a single management object class may include a locking entry for each management object that is currently locked by a running operation such as by a thread. For example, with reference to FIG. 4, shown is an example 200 of entries in a single locking table such as for the LUN management object class. Each entry in the table 200 corresponds to a single row having a unique entry ID 210 for a management object representing a LUN that is currently locked by a running operation and its associated locking state 212. For example, row 220 is the first entry or row of table 200 for a LUN represented by a management object. The state column 212 of row 220 indicates the locking state of LUN's management object. The information in the state column 212 may, for example, identify which operation(s) or thread(s) hold a lock on the represented LUN via its management object and may also indicate the lock type. The particular lock types may vary with embodiment and use case. For example, in one embodiment, the lock types may include a read R lock type and a write W lock type. To further illustrate, for example, entry 220 may represent the management object for LUN A where the state information 212 in row 220 may identify one or more threads each holding a read lock, or may, for example, identify one thread holding a write lock.

A write lock is an example of a blocking lock type and a read lock is an example of a non-blocking lock type. A first thread having a blocking lock type may block concurrent access of the represented resource by any other thread. A non-blocking lock type may allow concurrent access of the represented resource by another thread where the type of allowed concurrent access may be specified. For example, a first thread having a non-blocking lock type may allow concurrent access of the represented resource by another thread also having a non-blocking lock type. For example, a first thread may have a first read lock for the LUN A and a second thread may also concurrently have a second read lock for the LUN A.

Figure 5:
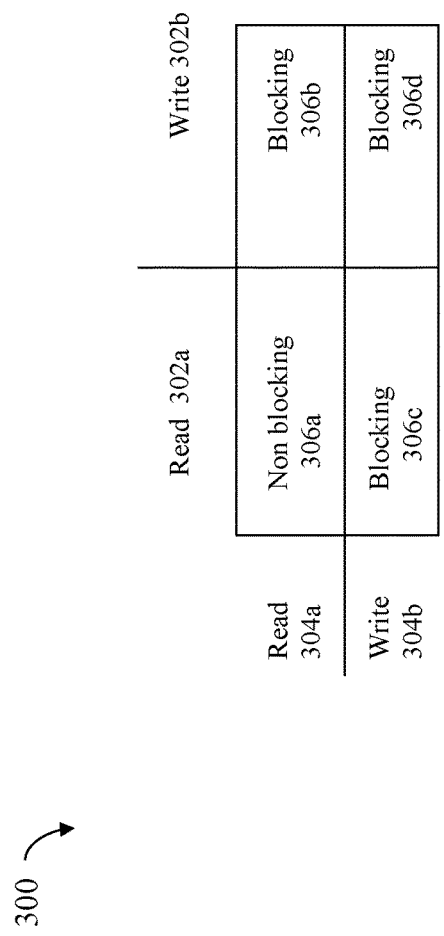

Referring to FIG. 5, shown is an example of a concurrency matrix for a read/write locking model as may be used in an embodiment in accordance with techniques herein. The example 300 illustrates whether a request to access or operate on an entity represented by a management object is blocked (e.g., not allowed) or non-blocking (e.g., allowed) in connection with an entity using read and write locks. For example, entry 306a indicates that if a first thread holds a read lock 302a for an entity and a second thread wishes to concurrently acquire a read lock 304a for the same entity, the second thread is not blocked from acquiring the read lock. More generally, 306a indicates that two or more threads may each concurrently hold a read lock for the same entity, such as a LUN.

Entry 306b indicates that if a first thread holds a write lock 302b for an entity and a second thread wishes to concurrently acquire a read lock 304a for the same entity, the second thread is blocked from acquiring, or not allowed to acquire, the read lock 304a. More generally, 306b indicates that only a single thread may acquire a write lock and once the write lock is acquired, no other thread may acquire any other lock (e.g., the single thread has exclusive access to the represented entity).

Entry 306c indicates that if a first thread holds a read lock 302a for an entity and a second thread wishes to concurrently acquire a write lock 304b for the same entity, the second thread is blocked from acquiring the write lock 304b. More generally, 306c indicates that a thread cannot acquire a write lock while currently being accessed with a read lock by another thread.

Entry 306d indicates that if a first thread holds a write lock 302b for an entity and a second thread wishes to currently acquire a write lock 304b for the same entity, the second thread is blocked from acquiring the write lock 304b. More generally, 306d indicates that a thread cannot acquire a write lock while currently being accessed with a write lock by another thread.

Generally, as noted above in connection with FIG. 5, the write lock may be further characterized as an exclusive lock (no other locks are allowed concurrently) and the read lock may be characterized as a shared lock where multiple read locks are allowed concurrently.

Figure 6A:
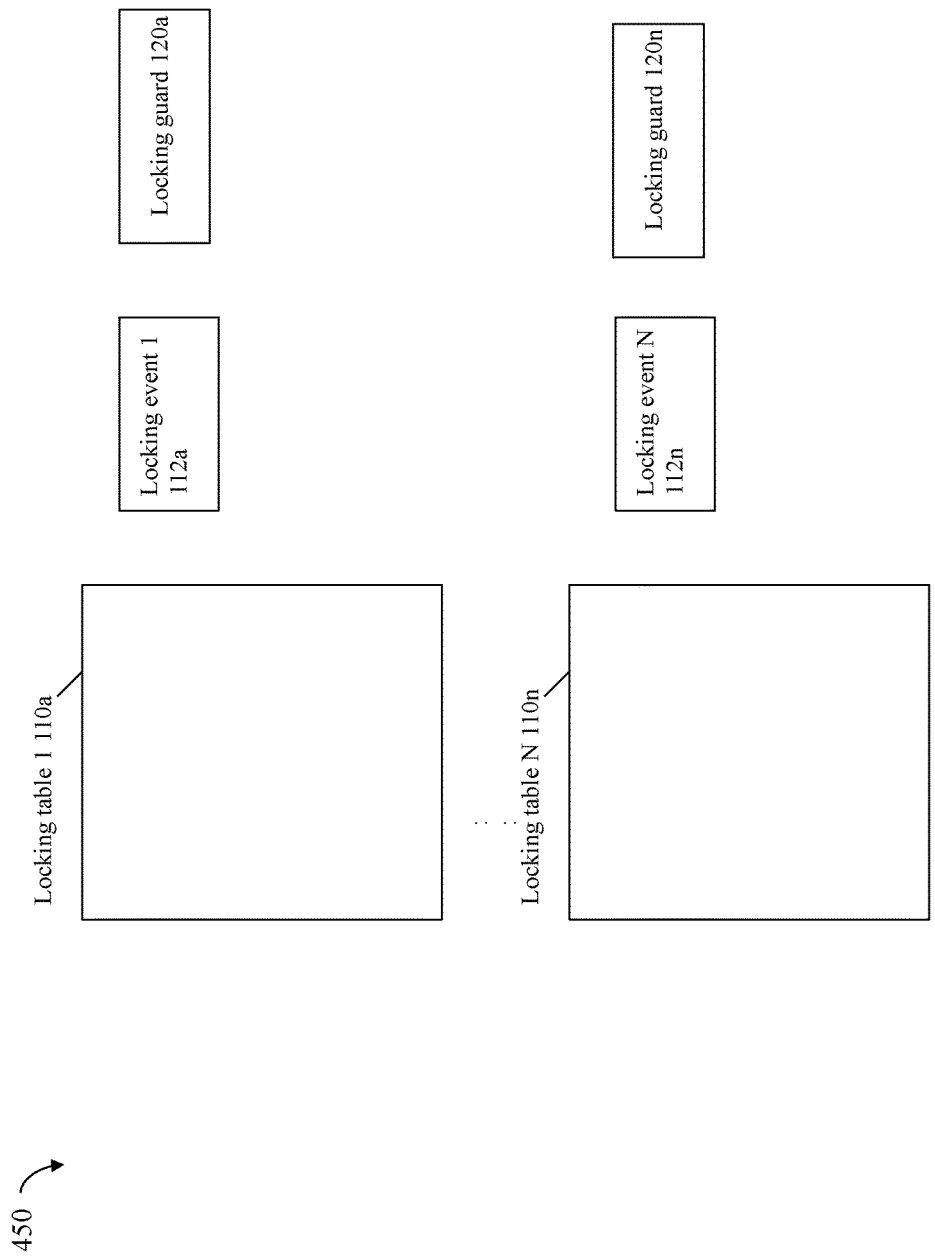

It should be noted that the read/write lock types and associated states and accesses of FIG. 5 is one example of lock types and accesses that may be used in an embodiment in accordance with techniques herein. As another example, an embodiment may have a lock type and associated allowed states whereby only exclusive access by any thread at any time is allowed. Thus, there may be no concurrent access of any type allowed for the entity represented by the management object. For example, with reference to FIG. 6, shown is a matrix 400 of the various lock types and associated allowed accesses where only a single thread is allowed to access the represented entity at any point in time (e.g., no concurrent access to the entity by two threads is allowed) regardless of whether the type of desired access. In this case, the matrix 400 may be reduced to a simple logical representation where if a first thread has a lock (exclusive) on the entity, a second thread is not allowed to concurrently access the entity and is not allowed to acquire any type of lock on the entity. In the example 400 of FIG. 6, all lock types acquired of read and write are exclusive access locks and thus the lock type may be expressed as a single lock type of exclusive rather than have 2 lock types of read and write.

More generally, additional lock types may be defined besides just read and write lock types. For example, an embodiment may define 3 or more lock types and specify what particular combination(s) of concurrent lock type accesses are allowed.

It should be noted that a single management object class and its single locking table may include multiple types of locks and associated access that may vary with entry. For example, a LUN locking table may represent the LUN object management class. A first LUN A may have a corresponding entry in the LUN locking table and operate in accordance with the concurrency matrix of FIG. 5. A second LUN B may have a different corresponding entry in the LUN locking table and operate in accordance with the concurrency matrix of FIG. 6.

With reference back to FIG. 3, also illustrated is a locking guard 120 and N locking events 112a-n. In at least one embodiment in accordance with techniques herein, operations with the locking tables 110a-n are protected by a single global locking guard 120. In one embodiment, the locking guard 120 may be represented by a standard operating system mutex whereby only a single thread may hold the locking guard 120 at any point in time. In order for a thread to read from, or write to, a locking table, the thread must acquire the locking guard 120 first. Thus, in such an embodiment having a single locking guard 120 associated with all locking tables 110a-n, a thread holding the locking guard 120 is guaranteed exclusive access to the locking tables 110a-110-n (e.g. no concurrent access to the locking tables by multiple threads).

As an example, a thread may need to access an entity such as a LUN A and must acquire a read lock with respect to that LUN. In such a case, the thread must first acquire the locking guard 120, read current state information, if any, for LUN A from the LUN locking table to determine whether the thread is able to acquire the desired read lock given the current state information in the LUN locking table for LUN A. For example, assume the LUN locking table indicates there are currently multiple read locks for LUN A, and the thread wants to now concurrently acquire a read lock. In this case, the thread may determine that it can acquire the read lock and may update the entry for LUN A in the LUN locking table to record the thread's read lock acquisition. Subsequently, the thread releases the locking guard.

Each locking table 110a-110n is also respectively associated with a locking event 112a-112n represented by a standard conditional variable or event primitive provided by the operating system. For example, locking event 112a may be associated with locking table 110a whereby locking event 112a is fired when the corresponding locking table 110a is changed. For example, a blocked thread may wait on a queue associated with the locking event for a particular locking table. When there is a change to the locking table, the one or more threads, if any, on the queue associated with the locking event may be signaled.

As an example, a thread may need to access an entity such as a LUN A and must acquire a write lock with respect to that LUN. In such a case, the thread must first acquire the locking guard 120, read current state information, if any, for LUN A from the LUN locking table to determine whether the thread is able to acquire the desired write lock given the current state information in the LUN locking table for LUN A. For example, assume the LUN locking table indicates there is currently a single read lock for LUN A, and the thread wants to now concurrently acquire a write lock. In this case, the thread may determine that it is blocked and cannot acquire the write lock, releases the locking guard, and then waits on the locking event associated with the LUN locking table. At a later point in time, the read lock for LUN A may be released and the entry for LUN A in the LUN locking table accordingly updated. The updating of the LUN locking table results in firing a locking event for the LUN locking table thereby notifying (e.g., awakening) the blocked and waiting thread. The thread may now resume execution, acquire the locking guard, and read LUN A's state information from the LUN locking table indicating that the thread can now acquire the write lock for LUN A. The thread may acquire the write lock for LUN A, accordingly update the LUN locking table to indicate that a write lock is held by the thread for LUN A, and then release the locking guard.

When a thread requires locking of a management object or a group of management objects of a particular object class associated with a first of the locking tables 110a-n, the thread acquires the locking guard 120 first, and then checks corresponding management objects' locking states (e.g., such as using the appropriate concurrency matrix as in FIG. 5 or 6) as indicated in the first locking table. If all required objects of the particular class are in unblocked states, the thread accordingly updates the first locking table for that particular object class to indicate that the thread acquired the desired lock(s) of the corresponding management object(s). The thread may then release the locking guard 120. If any one or more of the required objects of the particular object class needed by the thread are in blocked states, the thread releases the locking guard 120 and waits for a change state indication to fire on the corresponding locking event of the locking table including entries for those objects in the blocked states. For each object in a blocked state, the thread waits on the corresponding locking event of the locking table including the blocked object. When the thread receives a change state indication by one of the locking events firing, the thread repeats the foregoing same operations (e.g., acquire the locking guard, examine locking tables, and the like), until the thread acquires all desired locks. In one embodiment described herein, the thread may acquire all one or more locks for objects of particular class of an associated one of the locking tables as a single atomic unit or transaction. In other words, for one of the locking tables, assume the thread needs to acquire a first set of one or more object locks.

If the thread is able to acquire all object locks of the first set, the thread proceeds with acquiring all locks of the first set. However, if the thread is unable to acquire any one or more locks of the first set, then the thread may not acquire any lock of the first set until it is able to acquire all such needed locks of the first set. It the thread is unable to acquire any one or more locks of the first set, the thread may release the locking guard, and wait for a change state indication to fire on the locking event associated with the first locking table. In other words, in one embodiment, the thread may either acquire all needed locks associated with the single locking table, or otherwise wait until it can acquire all needed locks of the first set (of the single locking table) prior to acquiring any single lock of the first set.

With reference back to FIG. 3, shown is an example of an embodiment of techniques herein where a single locking guard 120 is associated with the entire set of locking tables 110a-n and a thread acquiring the single locking guard 120 is provided exclusive access to the entire set of locking tables 110a-n. As an alternative, with reference now to FIG. 6A, an embodiment may associate a different single locking guard with each of the different locking tables 110a-n. In other words, in a system having N locking tables 110a-n as in FIG. 6A, the embodiment may have N locking guards 120a-n where each of the locking tables 110a-n is associated with a different one of the N locking guards 120a-n and a thread acquiring one of the N locking guards associated with a particular one of the N locking tables 110a-n is provided exclusive access to the single particular one of the N locking tables 110a-n associated with the one locking guard. As a variation to that as described herein with respect to an embodiment with a single locking guard 120 for all N locking tables 110a-n, a thread that wants to acquire one or more objects included in a first of the locking tables 110a-n, such as locking table 110a, where the first locking table 110a is associated with locking guard 120a, first acquires the first locking guard 120a associated with locking table 110a. In this manner, a thread a provided exclusive access to each individual locking table providing a finer granularity of access control than in an embodiment using a single locking guard 120 as in FIG. 3.

An embodiment in accordance with techniques herein may use an interface such as Lock(obj1, obj2, . . . ) to attempt to acquire locks on objects denoted by obj1, obj2, and the like. Additionally, in a case where there are multiple types of locks that may be acquired, such an interface may provide for specifying the type of lock, such as read or write, being requested. For example, an embodiment may define a first interface of:

lock (obj1 (type1), obj2 (type2), . . . )

to acquire locks on objects obj1, obj2, and others identified in the call, where type1 denotes the lock type to be acquired for obj1, type2 denotes the lock type to be acquired for obj2, and so on.

An embodiment may also include an interface for unlocking or releasing one or more locks such as:

Unlock(obj1, . . . )

to release a currently held lock for object obj1, any other locks for other objects identified in the call.

An embodiment in accordance with techniques herein may also support recursive locking. In such an embodiment, a recursive counter may be associated with each lock whereby a thread may repeatedly reacquire a same lock multiple times. For example, assume thread1 acquires a lock for object1 and thread1 wants to again acquire the lock for object 1. In this case, thread 1 is allowed to repeatedly acquire the lock on object1. Each time thread1 acquires the lock on the same object, a counter associated with the lock is increment. Each time the lock is released (e.g., the object1 is unlocked), the counter may be decremented. In this manner, the counter may be initially 0 and the counter may be incremented by 1 for each acquisition of the lock and decremented by 1 for each release or unlock operation of the lock for object1. In one embodiment, the counter may be characterized as owned by thread. The value for the counter may be stored in thread-private storage, an entry of the appropriate locking table, and the like. In this manner, a thread can repeatedly acquire the same lock on the same object such as same read lock or same write lock for an object.

An embodiment in accordance with techniques herein may provide for proactive deadlock detection (e.g., assertion on detecting flows that can potentially lead to deadlocks) is possible by:

1) enforcing a locking table lock ordering and
2) not allowing "lock expansion" within a locking table.

In connection with item 1) above, enforcing a locking table lock ordering, an embodiment may specify a predefined ordering of locking tables whereby each thread requiring multiple locks on multiple objects must acquire any desired locks in accordance with this predefined ordering. For example, assumes there are N locking tables as illustrated in FIG. 3 and the predefined ordering of locking tables from which a thread may acquire locks is from 1 to N. In this manner, a first thread must acquire any/all desired locks from locking table 1 prior to acquiring any/all desired locks from locking table 2. The first thread must acquire any/all desired locks from locking table 2 prior to acquiring any/all desired locks from locking table 3, and so on. Thus, once a thread has acquired locks from locking table K (K being an integer in the inclusive range 1 to N), the thread cannot subsequently acquire a lock from a locking table in the predefined ordering prior to K. Each executing thread must follow the same predefined order. For example, thread 1 may acquire one or more locks for one or more LUN objects as denoted by the LUN locking table and then subsequently acquire one or more locks for one or more file system objects as denoted by the file system locking table. Thread 2 must also acquire locks for one or more objects of locking tables based on the same ordering. Thread 2 cannot first acquire locks for objects of the file system locking table prior to acquiring locks for objects of the LUN locking table.

In connection with item 2) above, not allowing "lock expansion" within a locking table, once a thread acquires locks for a first set of one or more objects in a first locking table and then acquires locks for a second set of one or more objects in a second locking table, the thread is not then subsequently allowed to expand or acquire locks on additional objects in the first locking table beyond those in the first set (e.g., thread cannot go back to acquire additional locks for objects of a previous locking table).

An embodiment in accordance with techniques herein may also enforce a rule that upon a thread's completion, exit or termination, any/all locks held by that thread may be released.

Figure 7:
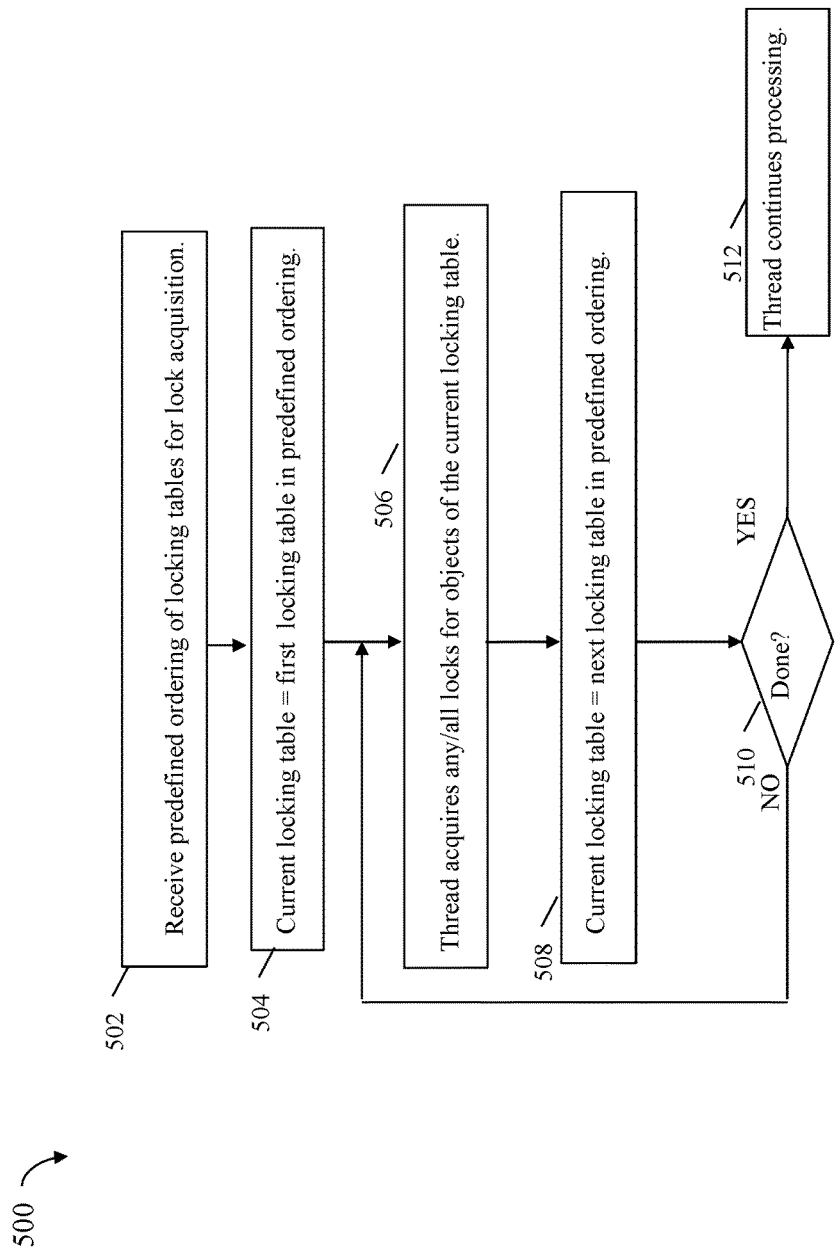
FIGS. 7, 8 and 9 are flowcharts of processing steps that may be performed in an embodiment in accordance with techniques herein.
Figure 8:
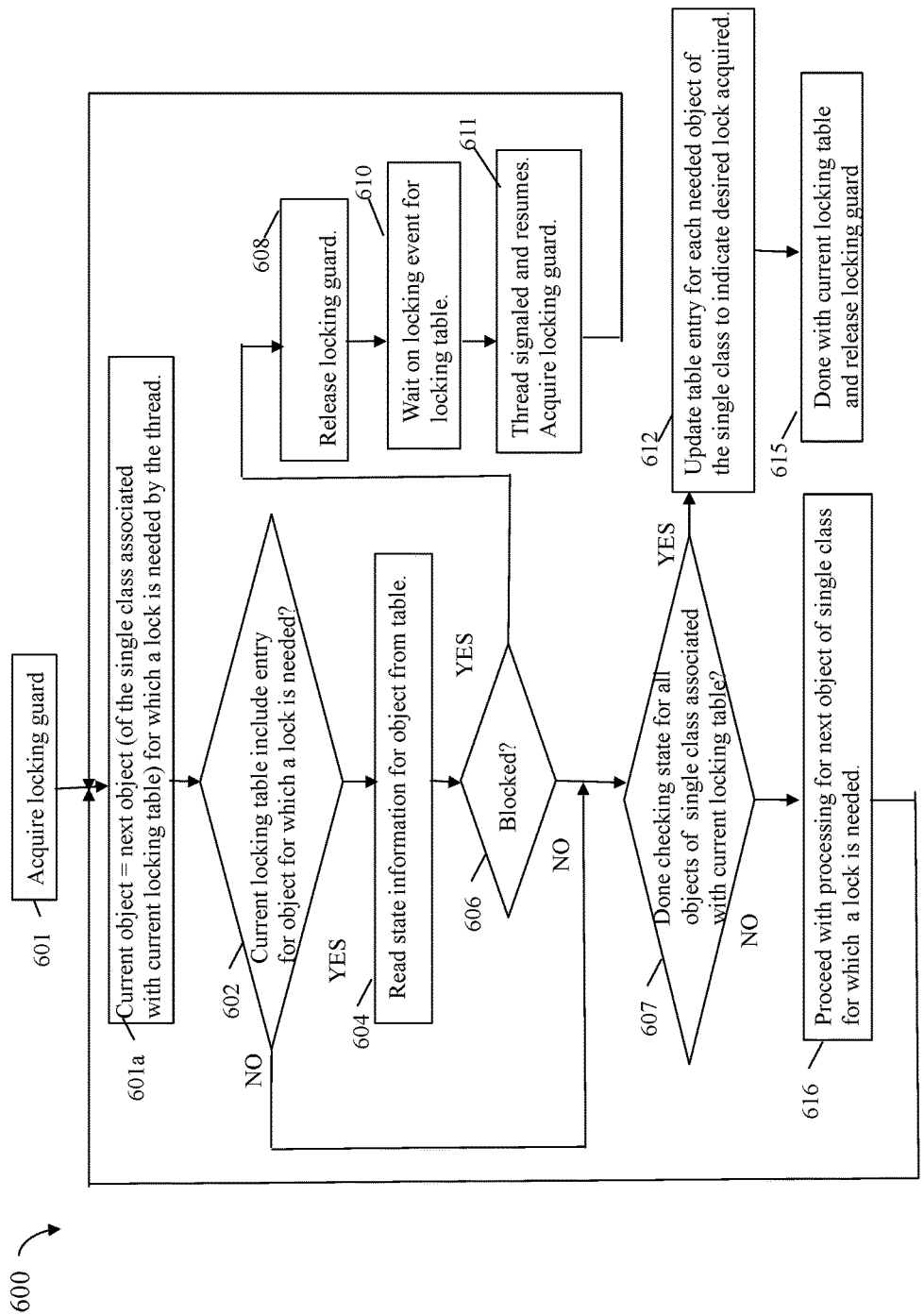

Techniques herein provide for easily dumping and restoring thread locking state information by including such information in the locking tables as described herein. Referring to FIGS. 7 and 8, shown are flowcharts of processing steps that may be performed in an embodiment in accordance with techniques herein. The flowcharts of FIGS. 7 and 8 summarize processing described above that may be performed in an embodiment in accordance with techniques herein.

Referring to FIG. 7, shown is a first flowchart 500 of processing steps that may be performed in an embodiment in accordance with techniques herein. At step 502, the predefined ordering of locking tables to be followed for lock acquisition may be received. For example, with reference to FIG. 3, the predefined ordering may specify a sequential ordering, from 1 through N, in which the locking tables are traversed in connection with acquiring locks. As described herein, such as in accordance with rules noted above, a thread may acquire any/all locks needed from a locking table having an associated ordering in the predefined ordering of M (M being an integer greater than 0 and less than N+1) prior to acquiring any lock needed from a second locking table having an associated ordering in the predefined ordering greater than M. In this manner, a thread may traverse the locking tables in the order specified by the predefined ordering and obtain any/all locks from each locking table before obtaining any other lock from another locking table subsequent in the predefined ordering. At step 504, current locking table is assigned the first locking table in the predefined ordering. At step 506, processing is performed so that the thread acquires any/all locks for objects needed in the current locking table. At step 508, current locking table is assigned the next locking table in the predefined ordering. At step 510, a determination is made as to whether all locking tables in the predefined ordering have been traversed. If so, step 510 evaluates to yes and control proceeds to step 512 and the thread may continue processing. If step 510 evaluates to no, control proceeds to step 506 to continue processing and acquire any/all locks for the current locking table.

Referring to FIG. 8, shown is a second flowchart 600 of processing steps that may be performed in an embodiment in accordance with techniques herein. The flowchart 600 provides further detail of step 506 of FIG. 7 and illustrates steps that may be performed for the current locking table for which one or more locks for objects are needed by an executing thread. The flowchart 600 processing is performed to acquire one or more needed locks of a single object class associated with a single locking table identified by the current locking table processing variable. As described above, in one embodiment in accordance with techniques herein, processing may be performed to determine whether the first thread can acquire all needed locks for objects of a single class associated with the current locking table. If the first thread is blocked from obtaining any one or more of the locks needed in the single class, the first thread may release the locking guard and wait on the locking event associated with the current locking table. In this manner, the first thread may wait to acquire all needed locks for objects of a single class associated with the current locking table until all such locks may be acquired.

At step 601, the thread acquires the locking guard. As described above, in one embodiment using the arrangement as described in connection with FIG. 3 with a single locking guard for all N locking tables, the locking guard acquired and further operated upon in connection with other processing steps of FIG. 8 is the single locking guard 120. As a variation in another embodiment using the arrangement as described in connection with FIG. 6A with a single locking guard for each of the N locking tables, the locking guard acquired and further operated upon in connection with other processing steps of FIG. 8 is the single locking guard 120 associated with the current one of the locking tables (e.g., current single locking table for which processing is performed with respect to FIG. 8 processing).

At step 601a, current object is assigned the next object of the single object class for which the thread needs to obtain a lock. At step 602, a determination is made as to whether the current locking table includes an entry for the current object for which a lock is needed. As described above, if there is no entry currently in the locking table for the current object for which a lock is desired, it means that the object is not currently locked by any thread (e.g., there is currently no lock of any type for the object held by any executing thread). If step 602 evaluates to yes, control proceeds to step 604 to read the state information for the object from the locking table and determine, in step 606, whether the current thread is blocked from acquiring its desired lock type on the current object. If step 606 evaluates to yes, control proceeds to step 608 to release the locking guard, and then proceeds to step 610 to wait on the locking event for the current locking table. At a later point in time, the waiting thread may be signaled or awakened when there is a modification to the locking table. The thread resumes processing at step 611 and acquires the lock guard and proceeds to step 601a.

If step 606 evaluates to no, control proceeds to step 607. If step 602 evaluates to no, the processing also proceeds to step 607. At step 607, a determination is made as to whether processing has checked the state of all objects of the single class, associated with the current locking table, for which the current threads needs to acquire a lock. If step 607 evaluates to no, control proceeds to step 616 to proceed with processing for the next object of the single lass for which a lock is needed by executing thread. From step 616, control proceeds to step 601a. If step 607 evaluates to yes, control proceeds to step 612. In step 612, the current locking table is updated to indicate that the needed lock(s) on objects of the single class associated with the current locking table are acquired. Step 612 may include updating a table entry for each needed object lock of the single class to indicate the needed object lock has been acquired by the thread. At step 615, processing is complete for the current locking table whereby all needed locks for objects included in the current locking table have been acquired by the thread. Step 615 may also include releasing the locking guard.

As noted above, an embodiment may also support recursive locking where a thread may reacquire a lock previously acquired by the thread. In such a case, a counter associated with the lock may be accordingly incremented with each lock acquisition and decremented with each lock unlock or release. Additionally, the rule noted above regarding no lock expansion may be enforced in an embodiment in accordance with techniques herein.

Figure 9:
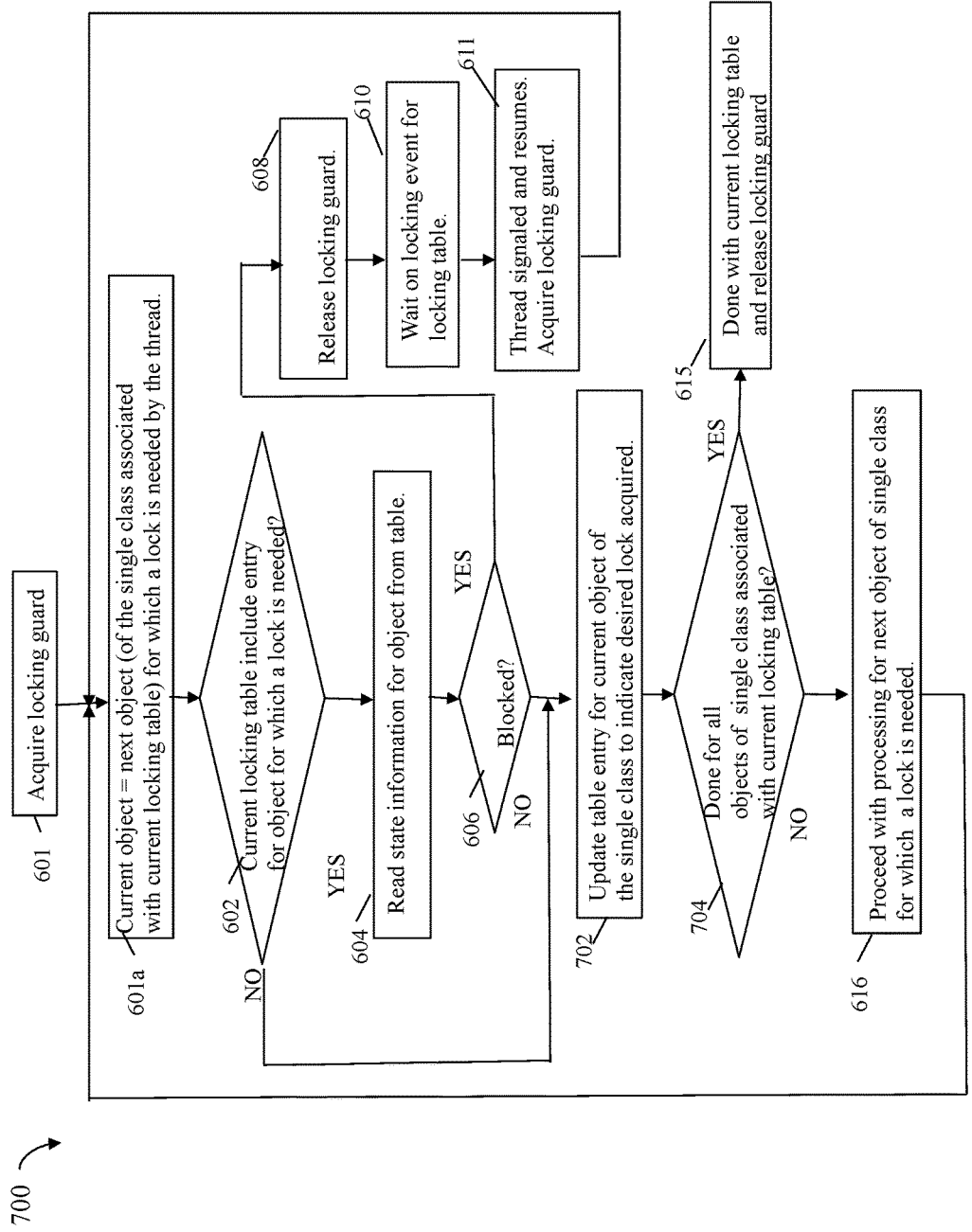

Referring to FIG. 9, shown is a third flowchart 700 of processing steps that may be performed in an embodiment in accordance with techniques herein. The flowchart 700 provides further detail of step 506 of FIG. 7 and illustrates steps that may be performed for the current locking table for which one or more locks for objects are needed by an executing thread. The flowchart 700 of FIG. 9 may be performed as an alternative to processing described above in connection with FIG. 8. FIG. 9 includes similarly numbered steps as in FIG. 8 with additional step 702 and a different logical processing order of steps than as in FIG. 8

FIG. 9 processing is performed to acquire one or more needed locks of a single object class associated with a single locking table identified by the current locking table processing variable. As described above, in one embodiment in accordance with techniques herein using FIG. 8, processing may be performed to determine whether the first thread can acquire all needed locks for objects of a single class associated with the current locking table. If the first thread is blocked from obtaining any one or more of the locks needed in the single class, the first thread may release the locking guard and wait on the locking event associated with the current locking table. In this manner, the first thread may wait to acquire all needed locks for objects of a single class associated with the current locking table until all such locks may be acquired.

As a variation from that in FIG. 8, FIG. 9 processing provides for a variation whereby a thread may acquire locks on individual objects from the same table, and acquire such object locks one at a time without requiring that the thread either obtain/acquire all such locks on objects of the single table at once, or acquire none until the thread is otherwise able to acquire all such locks.

At step 601, the thread acquires the locking guard. As described above, in one embodiment using the arrangement as described in connection with FIG. 3 with a single locking guard for all N locking tables, the locking guard acquired and further operated upon in connection with other processing steps of FIG. 9 is the single locking guard 120. As a variation in another embodiment using the arrangement as described in connection with FIG. 6A with a single locking guard for each of the N locking tables, the locking guard acquired and further operated upon in connection with other processing steps of FIG. 9 is the single locking guard 120 associated with the current one of the locking tables (e.g., current single locking table for which processing is performed with respect to FIG. 9 processing).

At step 601a, current object is assigned the next object of the single object class for which the thread needs to obtain a lock. At step 602, a determination is made as to whether the current locking table includes an entry for the current object for which a lock is needed. As described above, if there is no entry currently in the locking table for the current object for which a lock is desired, it means that the object is not currently locked by any thread (e.g., there is currently no lock of any type for the object held by any executing thread). If step 602 evaluates to yes, control proceeds to step 604 to read the state information for the object from the locking table and determine, in step 606, whether the current thread is blocked from acquiring its desired lock type on the current object. If step 606 evaluates to yes, control proceeds to step 608 to release the locking guard, and then proceeds to step 610 to wait on the locking event for the current locking table. At a later point in time, the waiting thread may be signaled or awakened when there is a modification to the locking table. The thread resumes processing at step 611 and acquires the lock guard and proceeds to step 601a.

If step 606 evaluates to no, control proceeds to step 702. If step 602 evaluates to no, the processing also proceeds to step 702. At step 702, the table entry for the current object of the single class is updated to indicate that the thread has acquired the desired lock for the single current object. At step 704, a determination is made as to whether processing of the current locking table has completed whereby the thread has acquired all needed one or more locks for one or more corresponding objects associated with the current locking table.

If step 704 evaluates to no, control proceeds to step 616 to proceed with processing for the next object of the single lass for which a lock is needed by executing thread. From step 616, control proceeds to step 601a. If step 704 evaluates to yes, control proceeds to step 615. At step 615, it is determined that processing is complete for the current locking table whereby all needed locks for objects included in the current locking table have been acquired by the thread. Step 615 may also include releasing the locking guard for the current locking table.

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of synchronizing operations performed on objects comprising:
receiving a plurality of locking tables, each of said plurality of locking tables corresponding to a different one of a plurality of object classes; and
performing first processing by a first thread to acquire a set of one or more locks, each lock in said set being a lock for one of the objects, said first processing including:
traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table, wherein each of said plurality of locking tables is associated with a different one of a plurality of locking events which fires when said each locking table is modified, and wherein said first processing further includes:
acquiring a locking guard by said first thread;
responsive to the first thread acquiring the locking guard, determining whether one or more objects in a first of the plurality of object classes associated with a particular one of the plurality of locking tables are currently in unblocked states whereby the first thread is able to acquire one or more locks on said one or more objects of the first object class; and
if it is determined that the first thread is not able to acquire the one or more locks on the one or more objects of the first object class, performing second processing comprising:
releasing the locking guard by the first thread; and
waiting on a first of the locking events associated with the particular one of the plurality of locking tables, wherein said locking guard is any of: a single locking guard associated with said plurality of locking tables that provides exclusive access to said plurality of locking tables to any thread holding the locking guard, and a first of a plurality of locking guards associated with the plurality of locking tables where the locking guard provides exclusive access to the particular one of the plurality of locking tables to any thread holding the locking guard.

2. The method of claim 1, wherein each of the objects represents an entity in a data storage system and wherein the entity is any of a physical or logical entity in the data storage system and includes any of a storage processor, a physical storage device, a logical device, a storage pool, a RAID group, and a storage group.

3. The method of claim 2, wherein each of the plurality of locking tables corresponds to a different classification of physical or logical entities in the data storage system.

4. The method of claim 3, wherein each of the objects that is included one of the object classes and is currently locked by a thread has an entry in one of the plurality of locking tables for said one object class.

5. The method of claim 4, wherein, at any point in time, if there is no entry in said one locking table for said each object, then said each object is not currently locked by any thread.

6. The method of claim 4, wherein said first entry in the first locking table includes state information indicating that the first thread holds said each lock on said one object.

7. The method of claim 6, wherein said each lock is any of a read lock and a write lock.

8. The method of claim 7, wherein said each lock is a read lock and indicates that shared read access to said one object is allowed by multiple threads whereby a subsequent attempt to concurrently acquire another read lock for said one object is allowed and a subsequent attempt to concurrently acquire a write lock for said one object is blocked.

9. The method of claim 7, wherein said each lock is a write lock and indicates that the first thread has exclusive access to said one object whereby a subsequent attempt to concurrently acquire any of a write lock and a read lock for said one object is blocked.

10. The method of claim 6, wherein said each lock is any of an exclusive lock and a shared lock, wherein if said each lock is an exclusive lock then a subsequent attempt to concurrently acquire any lock for said one object is blocked.

11. The method of claim 1, wherein the objects are data storage management objects reflecting internal states of data storage system entities represented by the objects, and wherein the objects are used to control synchronization of operations performed on the data storage system entities.

12. The method of claim 1, where said first thread is one of a plurality of threads and each of said plurality of threads acquires one or more locks for one or more objects needed by said each thread, and performs processing including:
traversing said plurality of locking tables in accordance with the predefined ordering and acquiring the one or more locks for one or more objects needed by said each thread.

13. A method of synchronizing operations performed on objects comprising:
receiving a plurality of locking tables, each of said plurality of locking tables corresponding to a different one of a plurality of object classes; and
performing first processing by a first thread to acquire a set of one or more locks, each lock in said set being a lock for one of the objects, said first processing including:
traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table, wherein each of said plurality of locking tables is associated with a different one of a plurality of locking events which fires when said each locking table is modified, and wherein said first processing further includes:
acquiring a locking guard by said first thread;
responsive to the first thread acquiring the locking guard, determining whether one or more objects in a first of the plurality of object classes associated with a particular one of the plurality of locking tables are currently in unblocked states whereby the first thread is able to acquire one or more locks on said one or more objects of the first object class; and
if it is determined that the first thread is not able to acquire the one or more locks on the one or more objects of the first object class, performing second processing comprising:
releasing the locking guard by the first thread; and
waiting on a first of the locking events associated with the particular one of the plurality of locking tables, and wherein the method further includes:
modifying the particular one of the plurality of locking tables;
responsive to said modifying, firing said first locking event of the particular one of the plurality of locking tables; and
responsive to said firing, resuming execution of said first thread and performing second processing including:
acquiring the locking guard by the first thread;
determining whether the one or more objects in the first object class associated with the particular one of the plurality of locking tables are currently in unblocked states whereby the first thread is able to acquire the one or more locks on said one or more objects of the first object class;
if it is determined that the one or more objects in the first object class associated with the particular one of the plurality of locking tables are currently in unblocked states, acquiring, by said first thread, the one or more locks on the one or more objects of the first object class.

14. The method of claim 13, wherein, for each of the one or more objects of the first object class for which the first thread acquired a lock, updating a corresponding entry in the particular one of the plurality of locking tables to indicate the first thread has acquired a lock on said each object.

15. A method of synchronizing operations performed on objects comprising:
receiving a plurality of locking tables, each of said plurality of locking tables corresponding to a different one of a plurality of object classes; and
performing first processing by a first thread to acquire a set of one or more locks, each lock in said set being a lock for one of the objects, said first processing including:
traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table, wherein each of said plurality of locking tables is associated with a different one of a plurality of locking events which fires when said each locking table is modified, and wherein said first processing further includes:

acquiring a locking guard by said first thread;
responsive to the first thread acquiring the locking guard, determining whether one or more objects in a first of the plurality of object classes associated with a particular one of the plurality of locking tables are currently in unblocked states whereby the first thread is able to acquire one or more locks on said one or more objects of the first object class; and
if it is determined that the first thread is not able to acquire the one or more locks on the one or more objects of the first object class, performing second processing comprising:
releasing the locking guard by the first thread; and
waiting on a first of the locking events associated with the particular one of the plurality of locking tables, and wherein the method further comprises:
if it is determined that the first thread is able to acquire the one or more locks on the one or more objects of the first object class, performing third processing comprising:
updating the particular one of the plurality of locking tables to indicate that the first thread has acquired the one or more locks on the one or more objects of the first object class; and
releasing the locking guard by the first thread.

16. A non-transitory computer readable medium comprising code stored thereon that, when executed, performs a method of synchronizing operations performed on objects comprising:
receiving a plurality of locking tables, each of said plurality of locking tables corresponding to a different one of a plurality of object classes; and
performing first processing by a first thread to acquire a set of one or more locks, each lock in said set being a lock for one of the objects, said first processing including:
traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table, wherein each of said plurality of locking tables is associated with a different one of a plurality of locking events which fires when said each locking table is modified, and wherein said first processing further includes:
acquiring a locking guard by said first thread;
responsive to the first thread acquiring the locking guard, determining whether one or more objects in a first of the plurality of object classes associated with a particular one of the plurality of locking tables are currently in unblocked states whereby the first thread is able to acquire one or more locks on said one or more objects of the first object class; and
if it is determined that the first thread is not able to acquire the one or more locks on the one or more objects of the first object class, performing second processing comprising:
releasing the locking guard by the first thread; and
waiting on a first of the locking events associated with the particular one of the plurality of locking tables, wherein said locking guard is any of: a single locking guard associated with said plurality of locking tables that provides exclusive access to said plurality of locking tables to any thread holding the locking guard, and a first of a plurality of locking guards associated with the plurality of locking tables where the locking guard provides exclusive access to the particular one of the plurality of locking tables to any thread holding the locking guard.

17. A system comprising:
a processor; and
a memory comprising code that, when executed by the processor, performs method of synchronizing operations performed on objects comprising:
receiving a plurality of locking tables, each of said plurality of locking tables corresponding to a different one of a plurality of object classes; and
performing first processing by a first thread to acquire a set of one or more locks, each lock in said set being a lock for one of the objects, said first processing including:
traversing said plurality of locking tables in accordance with a predefined ordering and acquiring the set of one or more locks, wherein, for each lock in the set, a first entry is updated in a first of said plurality of locking tables to indicate that the first thread has acquired said each lock on one of the objects included in an associated one of the plurality of object classes corresponding to said first locking table, wherein each of said plurality of locking tables is associated with a different one of a plurality of locking events which fires when said each locking table is modified, and wherein said first processing further includes:
acquiring a locking guard by said first thread;
responsive to the first thread acquiring the locking guard, determining whether one or more objects in a first of the plurality of object classes associated with a particular one of the plurality of locking tables are currently in unblocked states whereby the first thread is able to acquire one or more locks on said one or more objects of the first object class; and
if it is determined that the first thread is not able to acquire the one or more locks on the one or more objects of the first object class, performing second processing comprising:
releasing the locking guard by the first thread; and
waiting on a first of the locking events associated with the particular one of the plurality of locking tables, wherein said locking guard is any of: a single locking guard associated with said plurality of locking tables that provides exclusive access to said plurality of locking tables to any thread holding the locking guard, and a first of a plurality of locking guards associated with the plurality of locking tables where the locking guard provides exclusive access to the particular one of the plurality of locking tables to any thread holding the locking guard.

* * * * *

UNITED STATES PATENT AND TRADEMARK OFFICE
CERTIFICATE OF CORRECTION

PATENT NO. : 9,898,350 B2  
APPLICATION NO. : 14/903136  
DATED : February 20, 2018  
INVENTOR(S) : Sergey Alexandrovich Alexeev Page 1 of 1

It is certified that error appears in the above-identified patent and that said Letters Patent is hereby corrected as shown below:

On the Title Page

ITEM [71], insert:
--EMC IP Holding Company LLC, Hopkinton, MA (US)--

Signed and Sealed this
Twelfth Day of March, 2019

Andrei Iancu
*Director of the United States Patent and Trademark Office*